(No Model.)
J. B. BLOOD.
REGULATING ELECTRIC LOCOMOTIVES.
No. 501,488. Patented July 18, 1893.
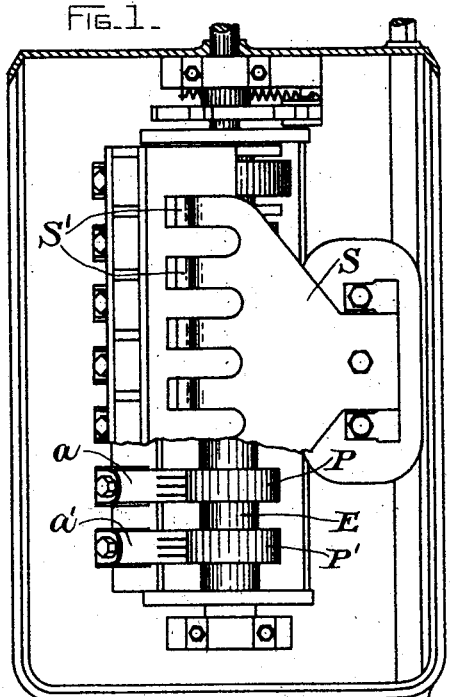
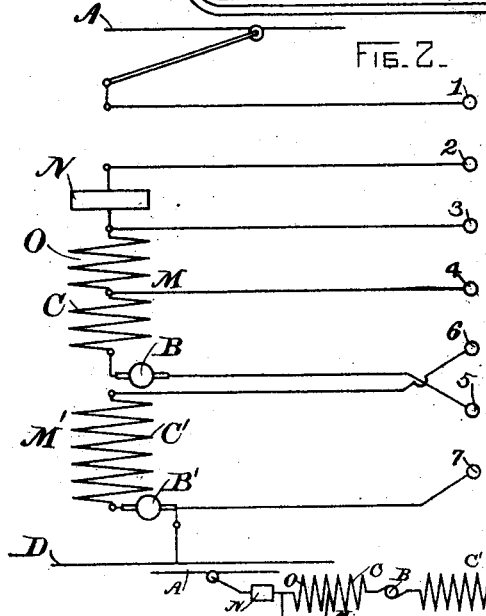
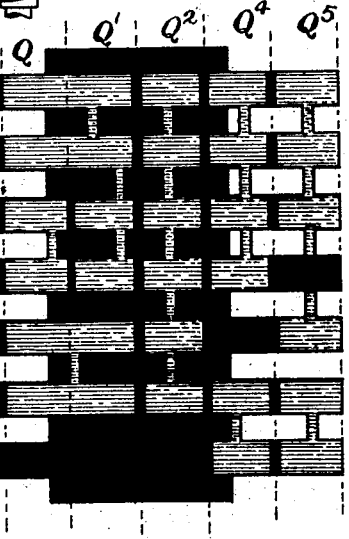
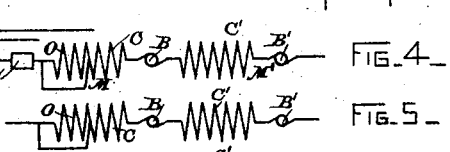
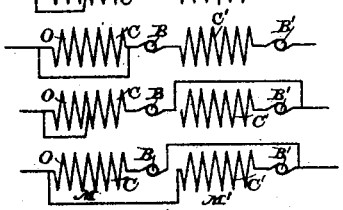
Witnesses—
Alec F. Macdonald.
A. O. Dene
Inventor—
John B. Blood
by
Burtley & Blodgett
Attys

UNITED STATES PATENT OFFICE.

JOHN B. BLOOD, OF LYNN, MASSACHUSETTS, ASSIGNOR TO THE GENERAL ELECTRIC COMPANY, OF NEW YORK.

REGULATING ELECTRIC LOCOMOTIVES.

SPECIFICATION forming part of Letters Patent No. 501,488, dated July 18, 1893.

Application filed November 16, 1892. Serial No. 452,119. (No model.)

*To all whom it may concern:*

Be it known that I, JOHN B. BLOOD, a citizen of the United States, residing at Lynn, county of Essex, State of Massachusetts, have invented a certain new and useful Improvement in the Regulation of Electric Motors, of which the following is a specification.

The object of my invention is to provide convenient and effective means for driving an electrically propelled mechanism at varying speeds, as for example an electric car driven by several motors supplied with current from a source of constant, or nearly constant, potential, and permitting the use of single arrangements of circuits and contact making mechanism for controlling the same.

The invention comprises two or more electric motors coupled in a single circuit, and adapted to drive either singly or together an electric car or other mechanism. One of the motors is more powerful than the other, and their respective windings are so proportioned that each motor normally develops a different counter-electromotive force from that of the other at a given speed, though for certain speeds and to meet certain conditions, their counter-electromotive force may be made substantially the same.

The invention likewise comprises proper switching apparatus so that the load may be thrown entirely upon either one of the motors or both may be coupled up in series or multiple, according to the speed desired.

In the accompanying drawings Figure 1 shows a suitable form of switch, the details of which are not my invention. Fig. 2 shows in diagram the motors and circuit connections. Fig. 3 shows the switch contacts extended on a plane surface, and Figs. 4 to 8 inclusive represent the motors as coupled up in the various possible combinations.

Two motors M, M' are represented connected in a single circuit from line A to the other branch of the circuit D, but it should be understood that the invention may include an additional number of motors as well. These motors are both of the series type with their armatures B, B' each in series with its own field winding seen respectively at C, C'. The two motors are wound with a different number of total ampère turns so that they will run at different speeds when placed on the same constant potential circuit. For example motor M' may be designed so as to run the car at ten miles an hour, and motor M under the same conditions to propel it at seven miles an hour, as a maximum in each instance. A resistance N will preferably be placed in series with the motors, and as shown in the diagram Fig. 2 contacts 1, 2, 3, 4, 5, 6, and 7 are connected respectively to line A, to the entering terminals of resistance N, accessory coil O upon the field magnet of motor M, and field winding C, to the negative or leaving terminal of armature B, to the entering terminal of field winding C', and again to the negative terminal of armature B'. Contact 7 is also connected to line D. These contacts also are connected respectively to fixed brushes $a$, $a'$, &c., which make contact electrically with rows of switch contacts shown diagrammed in Fig. 3, but which will in practice preferably be mounted on a rotating cylinder or shaft as at E in Fig. 1. As the switch is rotated the different rows of contacts are successively brought into engagement with the brushes, and thereby the desired regulation is effected. The various combinations for which provision is made are:

First. Both motors and the resistance in series, with the accessory field winding of motor M short circuited. This condition of affairs exists when the contacts engage row Q of the contacts on the switch barrel. The motors are then connected to line A through contacts 1 and 2, and contacts 3 and 4 are bridged at the switch so as to short circuit coil O, while the remaining contacts are connected only in series through the different members of the motors to which they lead. For this combination see Fig. 4.

Second. Both motors in series as before with the starting resistance cut out. This is the case when the switch has been moved so as to advance the brushes to the row of contacts marked Q', the only change being that contacts 2 and 3 are now also connected through the switch, short circuiting the resistance. The resulting condition of affairs is seen in Fig. 5.

Third. The resistance and motor M short circuited entirely. This is the case when the brushes engage the switch at $Q^2$, in effect putting contact 6 directly in connection with line A, from which contact the circuit passes through the field and armature of motor M' to line at D. This is shown in Fig. 6.

Fourth. The resistance and motor M short circuited. This is done by advancing the switch one step farther to the position $Q^4$, when contact 4 is, as it were, connected directly to line A, and contact 5 to the return line D. See for this combination Fig. 7.

Fifth. Both motors in multiple with resistance cut out but accessory coil O in circuit. This combination is brought about by moving the switch to position $Q^5$, and is diagrammed in Fig. 8.

When the motors are in series with the resistance N, see Fig. 4, the slowest speed of running is secured. The resistance N may then be cut out by moving the switch forward to the next position, as it is provided chiefly to prevent an abnormal current flow through the motors when they start from rest and have no counter-electromotive force of their own. When the two motors are each used individually and singly for driving the car, speeds will be attained differing in amount according to the special windings and proportions given them, and the short circuiting of the idle motor will do no arm as its armature will revolve in a direction opposite to that necessary to make it generate current. When the motors are thrown in multiple it is best to strengthen the field of the normally weaker machine by energizing the accessory winding thereon, so that the motors will have substantially the same counter-electromotive force when running at the same speed and will therefore divide the work equally between them.

By the arrangement described a wide range of regulation may be secured without complicating the number of combinations into which they are thrown relatively to one another, and without making it necessary to provide separate windings for each motor capable of being coupled up in various combinations as has heretofore been proposed, though of course my invention does not exclude the use of such multiple windings for the different motors if regulation of greater nicety is desired.

The form of switch shown in Fig. 1 is not specifically my invention, but has been introduced herein rather as showing one convenient and possible construction. The rows of contacts may be mounted on a cylinder of insulating material, or as is indicated, on collars P, P', &c., on a central shaft E. This central shaft is rotatable and preferably a blow-out magnet will be provided for rupturing any arc forming at the contacts, one pole of which is seen at S having divided fingers S' for concentrating a strong magnetic field at the necessary points.

What I claim as new, and desire to secure by Letters Patent, is—

1. The combination of a number of electric motors of normally different counter-electromotive force at a given speed, with switching mechanism for throwing such machines into parallel at will, and means for balancing or evening their counter-electromotive force when thus in parallel.

2. The combination of a number of electric motors for driving a vehicle or other mechanism, the normal field strength of one being greater than that of the other, with switching mechanism for coupling said motors in series or parallel at will, and means for augmenting the field of the weaker machine upon so doing, so as to make its counter-electromotive force approximately equal to that of the stronger machine, as described.

3. The combination of a number of electric motors of normally different counter-electromotive force, with a series parallel controller therefor, and an additional field winding on the weaker machine normally short circuited but brought into circuit when the machines are thrown into multiple to approximately equalize the counter-electromotive force of the machines, as set forth.

4. The combination of a number of electric motors of normally different counter-electromotive force, with a switch such that as it is thrown from open circuit position, the two motors are first coupled in series and the load then thrown successively upon the weaker and stronger machines in order to obtain increased speeds, as described.

5. The combination of a number of electric motors and a resistance, with a switch arranged to gradually cut out resistance when thrown from open circuit position, and by a still further movement to short circuit a motor after the resistance is cut out.

In witness whereof I have hereto set my hand this 9th day of November, 1892.

JOHN B. BLOOD.

Witnesses:
JOHN W. GIBBONEY,
BENJAMIN B. HULL.